United States Patent [19]

Perlin et al.

[11] Patent Number: 4,494,271
[45] Date of Patent: Jan. 22, 1985

[54] CASTER HAVING A THREE PIECE ENCAPSULATING BEARING ASSEMBLY

[75] Inventors: Morton J. Perlin, Miami Beach; Richard P. Garneau, Davie, both of Fla.

[73] Assignee: Perlin Materials Handling Development Co., Miami, Fla.

[21] Appl. No.: 326,053

[22] Filed: Nov. 30, 1981

[51] Int. Cl.³ ............................................. B60B 33/00
[52] U.S. Cl. .......................................... 16/21; 16/30; 16/DIG. 27; 16/18 A; 384/453
[58] Field of Search ............... 16/18 A, 20, 21, 26, 16/29, 30, 48, DIG. 27, DIG. 33; 308/174

[56] References Cited

U.S. PATENT DOCUMENTS

| D. 82,337 | 10/1930 | Malloy. | |
|---|---|---|---|
| 1,796,068 | 3/1931 | Van Der Meer | 16/21 |
| 1,882,497 | 10/1932 | Jarvis | 16/21 |
| 1,930,622 | 10/1933 | Noelting | 16/21 |
| 2,500,854 | 3/1950 | Mullen et al. | 16/21 |
| 2,500,886 | 3/1950 | Torkelson | 16/21 |
| 2,986,767 | 6/1961 | Rice et al. | 16/21 |
| 3,161,907 | 12/1964 | Anthony | 16/18 |
| 3,177,516 | 4/1965 | Price et al. | 16/18 |
| 3,296,650 | 1/1967 | Eurey et al. | 16/18 |
| 3,479,680 | 11/1969 | Clinton et al. | 16/21 |
| 3,675,269 | 1/1972 | Closa | 16/18 A |
| 3,991,434 | 7/1975 | James | 16/18 A |
| 4,034,436 | 7/1977 | Ginder | 16/18 A |

FOREIGN PATENT DOCUMENTS 1421781 1/1976 United Kingdom.

OTHER PUBLICATIONS

Catalog of Fallshaw Holdings Pty Ltd.

Primary Examiner—Fred A. Silverberg
Attorney, Agent, or Firm—Hedman, Gibson, Costigan & Hoare

[57] ABSTRACT

A caster which includes a neck at its top portion and a support at its lower portion to which a wheel is rotatably connected. About the neck are a ball bearing retaining plate and a top plate above and releasably secured to the ball bearing retaining plate. Within the plates and about the neck is a completely enclosed raceway which encapsulates thrust ball bearings. The top plate can readily be removed from the ball bearing plate to permit inspection, cleaning, modification, repair and replacement of components of the casters.

32 Claims, 9 Drawing Figures

CASTER HAVING A THREE PIECE ENCAPSULATING BEARING ASSEMBLY

FIELD OF INVENTION

This invention relates to casters and more particularly to casters which easily can be manufactured, inspected, cleaned, modified, repaired and replaced.

BACKGROUND OF INVENTION

Casters are extensively used to support and effect movement of a wide variety of objects, including carts, dollies, portable trucks and machines, and furniture. They handle static and dynamic loads on a wide variety of surfaces, such as wooden floors, rug covered floors, hard packed earth, concrete pavement, etc. For their size and weight, the loads casters handle are relatively large.

Presently available casters use kingpins or ball bearings between welded plates to handle the stress and strain imposed by these loads. Kingpins, however, are subject to fracture and shearing which results in premature replacement of casters that are otherwise undamaged. Welded plates with ball bearings therebetween, on the other hand, are more complex to manufacture, and are relatively difficult to repair, necessitating costly replacement of the caster. Also, the ball bearings are somewhat exposed to undesirable grit, dust, grease, etc., which accelerates wear and decreases their efficiency.

In producing casters, moreover, it is relatively costly to manufacture a line of swivel type casters (wheel both rotates in direction of and revolves about its axis) and another line of non-swivel type casters (wheel only rotates). Efforts, to date, to economically manufacture essentially interchangeable swivel and non-swivel types of casters have not been completely successful.

Other problems encountered with available casters are that they tend to corrode or to become clogged with filamentary materials or contaminated with dirt, grease, debris, etc. For example, in a warehouse storing textiles, filamentary materials, such as rug fibers, tend to be picked up by the caster and become lodged between the wheel and axle resulting in a jamming of the caster. In spite of many years during which casters have been used, and in spite of the many different designs of casters, the clogging by filamentary materials is still a major cause of caster malfunction. There also has been a long subsisting concern about casters for sanitary applications, such as hospitals, cafeterias and restaurants. Generally available casters, because of their construction, continue to tend to pick up and hold dirt, debris and other contaminants, as well as rust and corrode.

Thus, there is a need for new and improved casters which are not beset with these drawbacks.

SUMMARY OF THE INVENTION

The foregoing problems are overcome and other advantages are realized by the caster of the invention which does not require a kingpin or welded plates, which can be economically and readily manufactured as a swivel or non-swivel type caster, and which can include desirable anti-clogging, anti-contaminating and anti-corrosion features.

In accordance with the invention, the caster includes a neck at its top portion, and support means at its lower portion to which a wheel is rotatably connected. About the neck are a ball bearing retaining plate and a plate above and releasably secured to the ball bearing retaining plate. Within the plates and about the neck is a completely enclosed raceway which encapsulates ball bearings that handle the stress and strain imposed upon the caster.

Preferably the enclosed raceway is formed by complementary shaped annular grooves in adjacent portions of the neck and plates. To facilitate loading of the ball bearings, the ball bearing retaining plate and the neck preferably define an annular chamber therebetween immediately above and open to the annular groove in such plate, and the caster includes a platform at and about the lower portion of the neck and below such plate. Further, the length of the neck from below its annular groove to the platform is greater than the height of the portion of the ball bearing plate defining its annular groove. With the ball bearing plate on the platform its annular groove is below the annular groove in the neck portion and the ball bearings easily can be loaded into the annular chamber.

In assembly the top plate is supported by the caster neck so that its groove is in alignment with the annular groove in the neck. Fastening means depending from the top plate and into the loaded ball bearing plate raise it from the shoulder into alignment with the other annular grooves, whereupon the encapsulating raceway is formed with the ball bearings therein. Thereafter, release of the fastening means causes the ball bearing plate to move onto the platform providing access for inspection, modification, cleaning, repair or replacement.

To facilitate assembly of the plates, moreover, the plates preferably include means thereon to insure immediate and proper positioning thereof. For example, contiguous portions of the plates can include projection and notch means which mate. Accordingly, the plates can be quickly aligned without concern as to whether or not they are properly positioned.

Where the caster of the invention swivels, load ball bearings preferably are provided. In this embodiment adjacent portions of the top of the neck and the bottom of the top plate preferably include complementary annular or circular grooves which form a completely enclosed upper raceway. In assembly the load ball bearings are placed in the annular groove in the top of the neck before the top plate is placed on the neck. The fastening means then releasably secure the plates together with the thrust ball bearings in the completely enclosed raceway about the periphery of the neck and the load ball bearings in the completely enclosed load raceway on top of the neck.

Where the caster of the invention does not swivel, fastening means are provided which releasably secure the top plate directly to the neck of the caster. In this instance, the fastening means eliminate relative movement between the top plate and neck to provide a non-swiveling caster.

Thus, by allowing relative rotational movement between the neck and the top plate the manufacturer produces a swivel type caster and by preventing such movement the manufacturer readily and economically produces a non-swivel type caster.

In the preferred embodiment of the sanitary anti-clogging caster (swivel or non-swivel), the caster wheel is mounted on a single leg depending from the caster neck portion, wherein the hub of the wheel is offset towards the leg. The offsetting of the hub leaves a cavity in the wheel, opposite the leg. The cavity houses fastening means which secures the wheel to an end of the wheel axle, the opposite end of the axle being mounted by a stationary thread or contaminating guard to the leg. A cyclindrical wall, integrally molded with the wheel, surrounds the hub cavity and is capped by a disk to exclude filaments, dirt, debris and other clogging and contaminating matter.

In another preferred embodiment, the casters of the invention include anti-corrosion and washable components, including plates, neck platform and support means, which are made from a resin mixture of fiberglass fibers bound together by polyethylene terephtalate which provides synthetic caster components of substantial strength, hardness and rigidity which withstand external and internal loads and forces imposed upon the caster.

Other and additional embodiments of the casters of the invention will become apparent from the following illustrative embodiments and from the accompanying claims.

BRIEF DESCRIPTION OF THE DRAWINGS

The following is a detailed description together with accompanying drawings of illustrative embodiments of the invention. It is to be understood that the invention is capable of modification and variation apparent to those skilled in the art within the spirit and scope of the invention.

In the drawings:

Referring to FIGS. 1–4, there is shown a caster 10 of the invention which is of the swivel type. The caster 10 includes a unitary frame 12 in the form of a fork having an upper horizontal annular shoulder or platform 13 from which legs 14 depend and between which is provided an integral semicircular strengthening member 15. Journaled between and rotatably connected to the lower portion of the legs 14 is a roller or wheel 16 by virtue of which the caster 10 rolls along a floor or other surface. Centrally positioned on and extending upwardly from the shoulder is an integral cylindrical neck 18. About the neck 18 are a removable annular ball bearing plate 20 and a rectangular top plate 22 which with the neck 18 form annular raceways 24 and 26 (FIG. 4) for thrust ball bearings 28 and load ball bearings 30.

Figure 1:
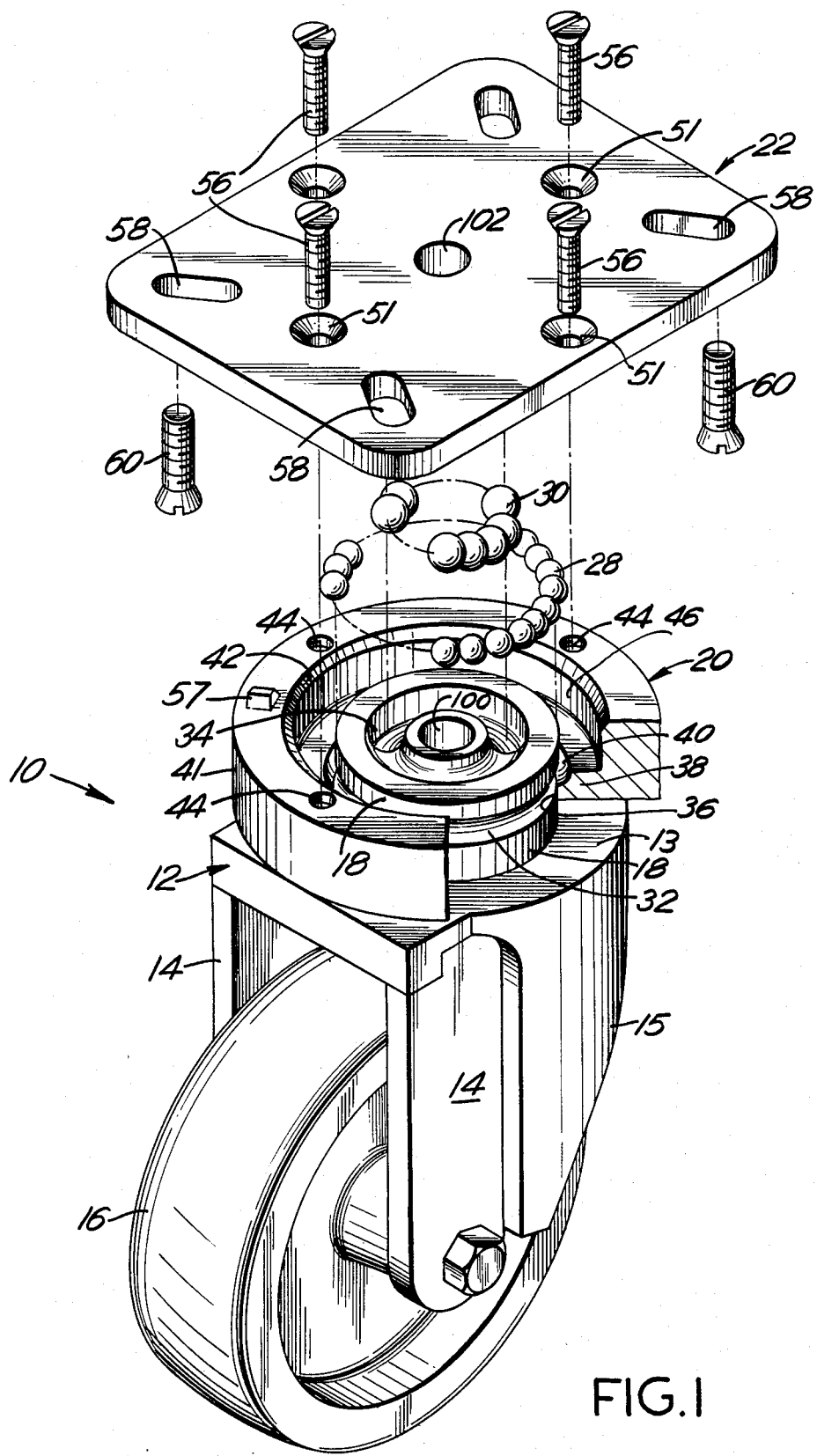
FIG. 1 is an exploded, perspective view of a swivel caster of the invention which includes thrust and load bearings encapsulated within annular raceways formed by the neck, ball bearing plate and top plate.

The integral neck 18 has an annular groove 32 about the central portion of its periphery for forming the thrust raceway 24, and an annular or circular groove 34 in the top of the neck 18 for forming the load raceway 26. The peripheral annular groove 32 is semicircular and is perpendicular to the longitudinal axis of the neck 18. The groove 32 forms two quadrants or one-half of the thrust raceway 24. The upper or top annular groove 34 is semicircular and is parallel to the longitudinal axis of the neck 18. The groove 34 forms the lower half of the raceway 26.

The removable annular ball bearing plate 20 has a central opening 36 therethrough, a lower inwardly extending annular and horizontal rim 38 with annular groove 40, an outer annular sleeve 41 with upper outwardly flared lip 42 for facilitating engagement with the top plate 22, and threaded holes 44 for releasably securing the plates 20 and 22 together.

With respect to the rim 38, it slidably fits about the neck 18, and the annular groove 40 is at its innermost and upper end. The groove 40 forms the lower quarter or quadrant of the raceway 24. It is perpendicular to the longitudinal axis of the neck 18, and when it is in its operating position (FIG. 4) the groove is contiguous and directly opposite the lower portion of the semicircular annular groove 32.

Figure 2:
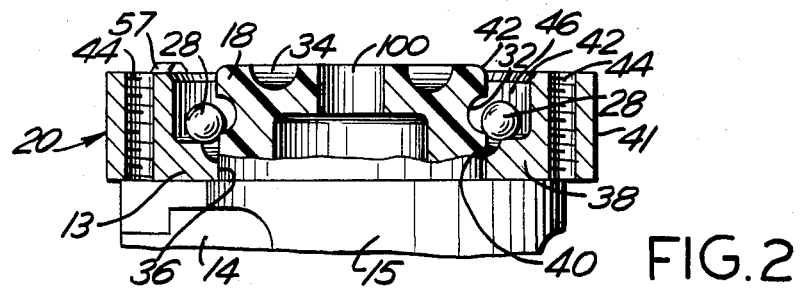
FIG. 2 is a partial, cross-sectional view of the caster of FIG. 1, illustrating the loading of the thrust ball bearings.
Figure 3:
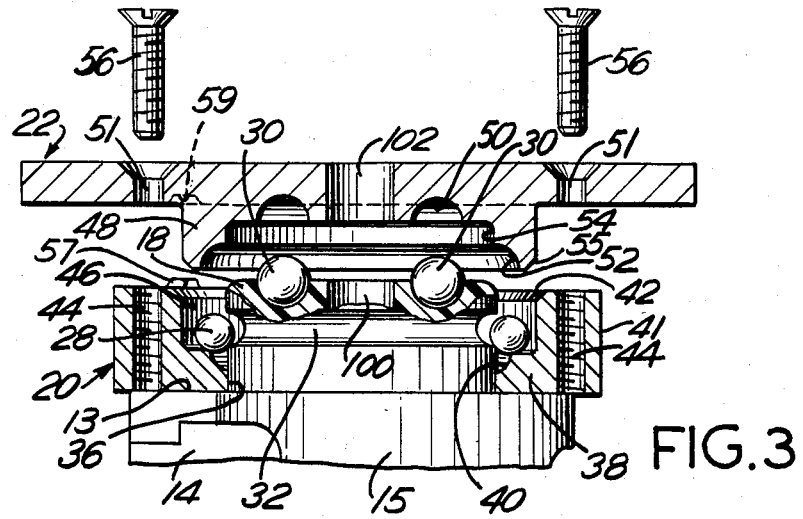
FIG. 3 is a partial, cross-sectional view of the caster of FIG. 1, illustrating the loading of the thrust and load ball bearings and the positioning of the top plate for assembly.

As shown in FIGS. 2 and 3, the outer annular sleeve 41 extends vertically upward with its inner wall and the outer periphery of the neck 18 spaced apart, and forming an annular chamber 46 for receiving the thrust ball bearings 28 and the top plate 22.

To facilitate loading of bearings 28, the height of the rim 38 is less than the height of the neck 18 from below the groove 32 to the shoulder 13, and the shoulder 13 forms a platform for the rim 38 with the annular groove 40 just below the semicircular groove 32. This provides a relatively large space or chamber 46 into which the bearings 28 can be loaded.

Figure 4:
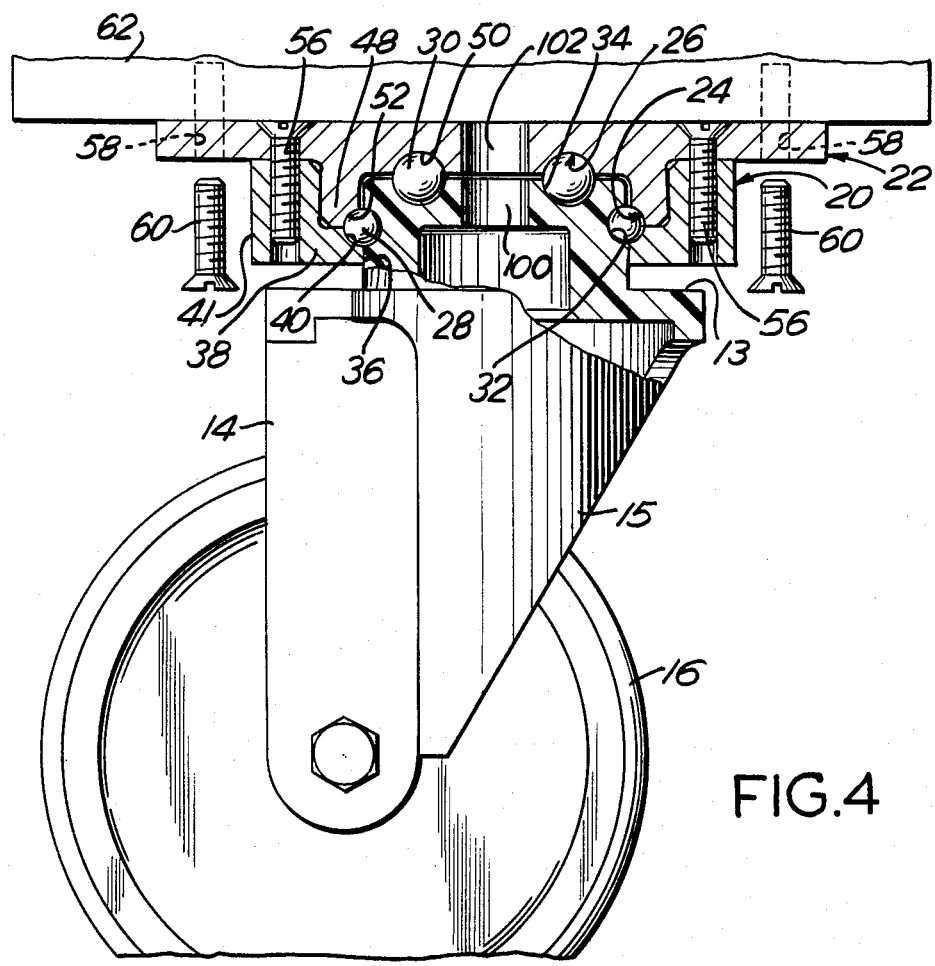
FIG. 4 is a partial, cross-sectional view of the caster of FIG. 1, illustrating the completed caster assembly ready to be secured to the object it will carry.

The top plate 22 includes a central depending inner annular sleeve 48, an annular groove 50 within the sleeve 48 and in the bottom wall of the plate 22, and holes 51 which extend through the plate 22 (FIGS. 3 and 4).

The outer wall of the annular sleeve 48 slidably engages the inner wall of the outer sleeve 41 when it extends into the chamber 46 and about the neck 18. The sleeve 48 is vertical and has an axis parallel to the neck 18. The inner annular wall of the sleeve 48 includes two annular contiguous horizontal grooves 52 and 54. The lowermost groove 52 has a diameter which is greater than the diameter of the groove 54, and forms the remaining and upper quadrant or quarter of the thrust raceway 24. The upper groove 54 has a diameter which essentially is the same as the diameter of the neck 18 so that the inner and upper portion of the sleeve 48 slidably fits about and rests on the neck 18.

To facilitate entry of the sleeve 48 in the annular chamber 46, the outer and lowermost portion of the sleeve 48 is tapered inwardly to form a lip 55 which is complementary to the lip 42 in the uppermost portion of the ball bearing plate sleeve 41.

The annular or circular groove 50 in the upper and bottom wall of the plate 22 within the sleeve 48 forms the upper half of the raceway 26. Like the groove 34, it is semicircular and is parallel to the longitudinal axis of the neck 18.

As shown in FIG. 1, there are four counter-sunk holes 51 which are in alignment with four threaded holes 44 in the plate 20. The holes 51 are positioned about the outside of the sleeve 48 at 90 degree intervals and the holes 44 are similarly positioned in the plate 20. Screws 56 are used to releasably secure the plates 20 and 22 together after the thrust and load ball bearings 28 and 30 are loaded.

To insure quick and accurate alignment of the plates 20 and 22, the ball bearing plate 20 includes a projection 57 and the top plate 22 includes a mating notch 59 in their contiguous upper and lower surfaces, respectively, outside the top plate sleeve 48 and between holes 44 and 51, respectively.

In the embodiment shown in FIGS. 1-4, the plate 22 is rectangular, and has corner slots 58 extending therethrough for receiving screws 60 to secure the assembled caster 10 to an object 62, such as a cart, dolly, portable truck and machine, or furniture. When the caster 10 is secured to the object 62 the weight of the load is transferred from the plate 22 to the wheel 16 through the plate 20 and frame 12.

Also, in this preferred embodiment the thrust ball bearings 28 are smaller than the load ball bearings 30 to facilitate encapsulating the thrust ball bearings 28 and to allow the caster 10 to handle relatively large loads.

In assembling the caster 10, the ball bearing plate 20 is slidably fitted on the neck 18 and its bottom rests on the platform 13 (FIG. 2). The rim groove 40 is below the neck groove 32 which is open to the annular chamber 46. This arrangement greatly facilitates loading of the thrust ball bearings 28 because the space is relatively large and accessible. Concurrently, the load ball bearings 30 can be placed in the annular groove 34. Then the top plate 22 is placed on the neck 18 with its sleeve 48 slidably fitting in the chamber 46 (FIG. 3).

Next, the fastening means releasably secure the plates 20 and 22 together by raising or lifting the plate 20 from the platform 13 and bringing it into engagement with the plate 22 along their coextensive surfaces (FIG. 4). In this embodiment the fastening means are screws 56 which are passed through holes 51 and threaded into the holes 44. In so doing, the screws 56 can draw the plate 20 from platform 13 up into engagement with the plate 22. In any event quick and accurate alignment is provided by rotating one or both of the plates 20 and 22 until the projection 57 and notch 59 engage each other. The caster 10 is now assembled. As shown, with the plates 20 and 22 in position about the neck 18, the raceways 24 and 26 are completely enclosed and encapsulate the bearings 28 and 30 to inhibit undesirable grit, grease, dirt, debris and other matter from entering and damaging the raceways 24 and 26 and bearings 28 and 30.

To inspect, clean, modify, repair or replace components of the caster 10, the screws 60 are withdrawn and the caster 10 is removed from the object 62, and the screws 56 are removed to release the plates 20 and 22 from the neck 18 and to provide access to such components and the bearings 28 and 30.

In the embodiment of the invention just described, the caster 10 is of the swivel type in which the wheel 16 can roll along a surface, and the wheel 16 and frame 12, including the neck 18, can rotate about the axis of the castor 10 while the plates 20 and 22 are secured to the object. In the next embodiment of the invention (FIGS. 5-7) the caster 10 does not swivel.

Figure 7:
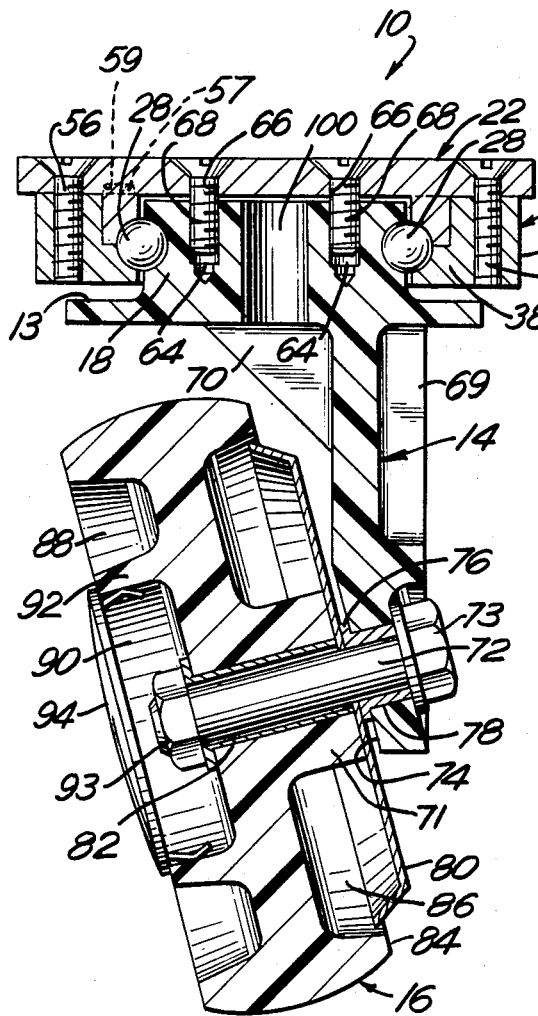
FIG. 7 is a cross-sectional view of the caster of FIG. 5, taken along the lines 7—7, illustrating, inter alia, the non-swiveling feature of the invention.

As particularly illustrated in FIG. 7, the wheel 16 does not rotate about the caster axis; it only rolls or rotates along a surface. This is accomplished by locking the neck 18 to the top plate 22 which, in turn, is fastened to the object 62. In this instance, the neck 18 cannot rotate relative to the secured top plate 22 and object. As shown, the load bearings 30 and load raceway 25 have been eliminated. In their place the neck 18 includes two opposing threaded holes 64 extending into the top thereof, and the top plate 22 includes two similarly positioned counter-sunk holes 66 therethrough. Fastening means, such as screws 68, extend through the top plate holes 64 and into the neck holes 66 to lock the top plate 22 and the neck 18, thereby insuring that the wheel 16 only can rotate in the direction of its axis.

In practice, this non-swiveling feature can be provided for all embodiments of the invention, including casters 10 having frames 12 with one or two legs 14 (compare FIGS. 1-4 and 5-7). In each instance the non-swivel feature can readily and economically be provided by the manufacturer because the basic structure of the caster 10 does not change, and because relatively few additional parts are necessary to go from a swivel to a non-swivel type caster. Additionally, the user of the caster 10 can be provided with the option of having a swivel or non-swivel type caster 10 either by providing a non-swivel caster in which the user can remove the fastening means to allow swiveling or by providing a swivel caster with separate fastening means, which the user can employ to secure the top plate 22 and neck 18 together.

Figure 5:
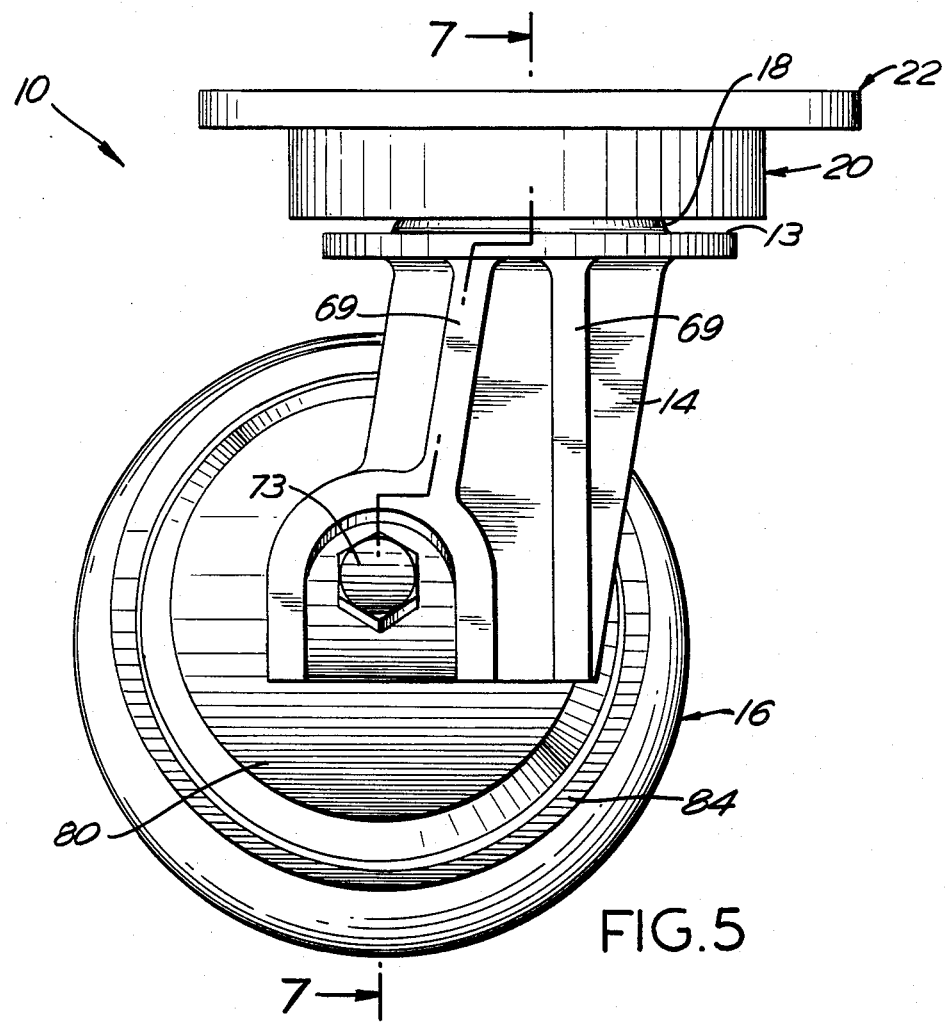
FIG. 5 is a side view, in elevation, illustrating a sanitary, anti-clogging caster of the invention.
Figure 6:
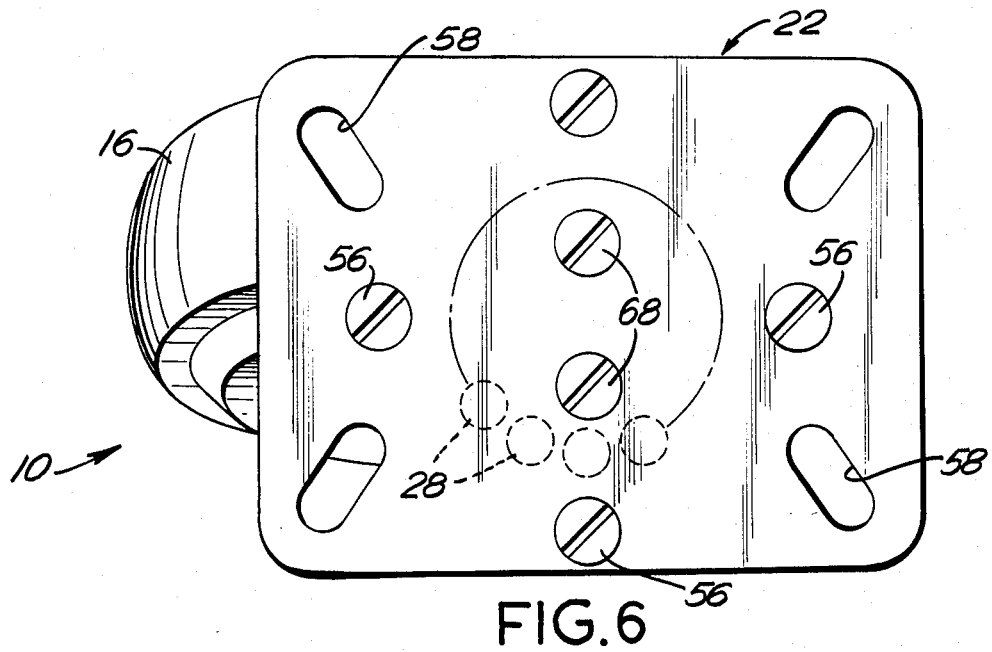
FIG. 6 is a plan view of the caster of FIG. 5.

The caster 10 of FIGS. 5-7 also includes an illustrative embodiment of a caster 10 which inhibits clogging and contamination, such as by threads, other filamentary matter, dirt, grit, grease, debris and other contaminants. As shown, the caster 10 of these figures has a single leg 14 to which the wheel 16 is connected. For strength the leg 14 has vertical ribs 69 and an interconnecting diagonal rib 70 between the leg 14 and the bottom of the platform 13.

A hub 71 of the wheel 16 is secured to the leg 14 by a bolt 72 and a nut 73 threaded thereto. A mating face 74 of the leg 14 is inclined at a camber angle of typically 15° relative to the vertical, or longitudinal, axis of the leg 14, and is oriented parallel to the end of the hub 71 from which it is spaced by the lip 76 of a cylindrical insert 78. A cap or guard 80 and a hollow shaft or bushing 82 are fixedly secured by the bolt 72 to the leg 14 and slidably pass through the hub 71. The wheel 16 has rim 84, the back edge thereof which defines a cavity 86 that faces the cap or guard 80. The wheel 16 rotates about the shaft 82 while the inner aspect of the rim 84 abuts the outer circular edge of the guard 80 to prevent the entry of threads, fibrous materials, grit, dirt, debris and other contaminants into the cavity 86 and around the rear of the hub 71.

In accordance with the invention, the hub 71 is offset towards the rear surface of the wheel 16, and the front surface of the wheel 16 is formed of two concentric cavities 88 and 90 which are separated by a circular rib 92. The outer cavity 90 is bounded by the rib 92 and the rim 84. The inner cavity 88 encloses the nut 93 and is closed off by a cap 94 to prevent the entry of threads, fibrous materials, grit, dirt, debris, etc. in and around the nut 93 and the front portion of the hub 71. Thus, the offsetting of the hub 71 and the capping of the inner cavity 88 prevent clogging and contaminating the front of the wheel 16, while the cavity 86 and guard 80 prevent clogging or contaminating the back of the wheel 16.

Figure 8:
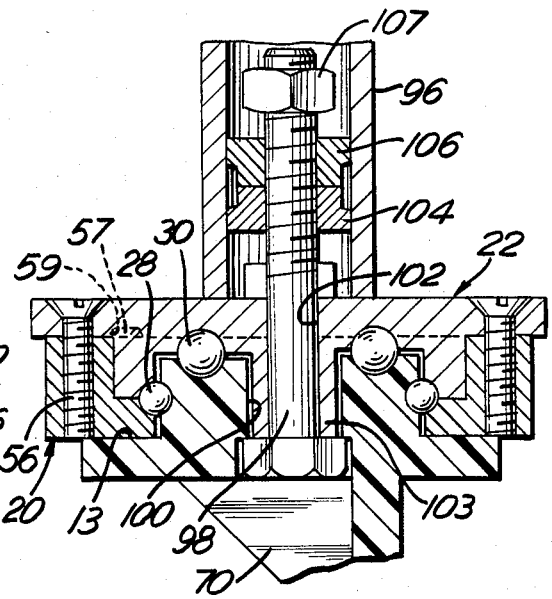
FIG. 8 is a side view, partially in section, of another embodiment of the caster in which a bolt is used to secure a caster of the invention within a hollow leg of the object to be carried.
Figure 9:
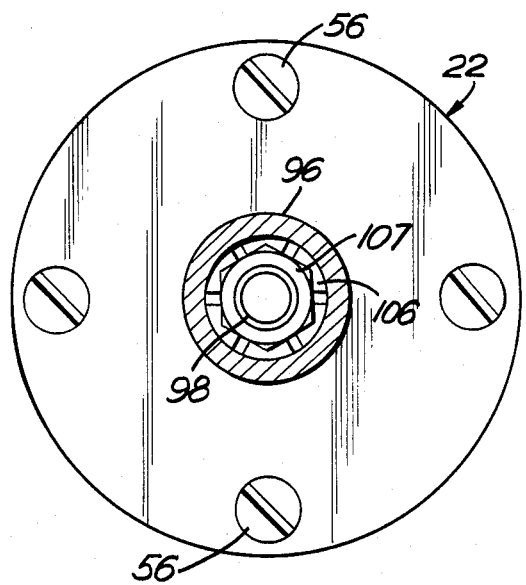
FIG. 9 is a plan view of the caster of FIG. 8.

Referring now to FIGS. 8 and 9, there is shown a swivel type caster 10 of the invention secured to a load, such as a table with hollow tubular legs 96 (only one of which is shown). In this embodiment, a bolt 98 passes through central openings 100 and 102 in the neck 18 and top plate 22, respectively, and into the leg 96 for securing the caster 10 thereto. As shown in FIG. 8, the opening 102 extends though the plate 22 and an inner sleeve 103 which slidably extends into the neck opening 100. Expandable bushings 104 and 106 within the leg 96 expand to securely contact the interior surface of the leg 96 upon tightening the bolt 98 against a nut 107 within the top of the bushing 106. In this embodiment the supporting diagonal rib 70 between the base of the neck 18 and the leg 14 is offset from the central opening 100 to provide clearance for access to the head of the bolt 98 for tightening and loosening by a conventional tool, such as a wrench.

In this embodiment, moreover, the top plate 22 is circular rather than rectangular to illustrate that top plates 22 of different configurations can be used in the practice of the invention.

In addition, and in accordance with the present invention, the plates 20 and 22 and the caster frame 12, including the platform 13, leg(s) 14 and neck 18, preferably can be formed from a resin mixture of fiberglass fibers bound together by a polyester resin, wherein the amount of fiberglass is approximately 45% by weight of the mixture. The resin, polyethylene terephthalate, is manufactured by DuPont under the trademark by RYNITE 545. This synthetic material is anti-corrosive and washable. It provides greater strength than other synthetic materials heretofore used in casters and is hard and rigid, and withstands the external forces as well as the internal forces of the bearings 28 and 30 within the raceways 24 and 26.

While the described resin mixture is preferred, the caster 10 of the invention can be formed from conventional materials, including steel and nylon where the loads are relatively light. The wheel 16 preferably is made from materials with wear resistance, dimensional stability and abrasion. Depending upon the application an injection molded polyolefin, polyurethane, nylon, hard or soft rubber, wood, iron, steel, or a rimmed wheel 16 can be used. The ball bearings 28 and 30 preferably are made of stainless steel but other materials can be used for such bearings, including synthetic materials sold by DuPont under the trademark DELRIN. In any event, the selected material used for the bearings provides free swivel action of the caster 10 under a wide variety of load conditions.

In a typical embodiment of the swivel caster 10 of FIGS. 1-4, the wheel 16 is 4 inches and is made from an injection molded polyolefin. The frame 12 (platform 13, legs 14 and neck 18) and the plates 20 and 22 are formed from the described resin mixture and can withstand loads of up to about 250 pounds per caster. The height of the caster legs 14 and neck 18 are about 3.97 inches with legs 14 of about 3.06 inches. The neck 18 is about 0.910 inches in height and about 1.75 inches in diameter. The platform 13 is generally cylindrically shaped and has a diameter of about 2.75 inches. The height of the neck 18 from below the groove 32 to the platform is about 0.360 inches. The raceway 24 has a diameter of 0.220 inches and the raceway 26 has diameter of 0.312 inches. The bearings 28 and 30 are made of stainless steel.

The top plate 22 is about 4.38 inches long and 3.38 inches wide. The outer annular surface of the sleeve 48 depends about 0.437 inches from the plate 22, while its inner annular surface depends about 0.312 inches. The sleeve 48 has an outer diameter of about 2.29 inches and an inner diameter of about 1.75 inches. The ball bearing plate 20 has an outer diameter of about 3.25 inches, an inner diameter at the rim of about 1.781 inches and an inner diameter at the wall which defines the chamber 46 of about 2.312 inches. The height of the rim 38 is about 0.219 inches, and the height of the chamber 46 is about 0.437 inches.

The invention in its broader aspect is not limited to the specific described embodiments and departures may be made therefrom within the scope of the accompanying claims without departing from the principles of the invention and without sacrificing its chief advantages.

What is claimed is:

1. A caster comprising:
    a neck at the top portion of the caster,
    a platform at and about the lower portion of said neck,
    leg means depending from said platform for securing a wheel thereto,
    a rotatable wheel journaled to said leg means,
    a ball bearing retaining plate normally about said neck and adjacent to said platform,
    a top plate about said neck and above and releasably secured to said ball bearing retaining plate,
    complementary annual grooves in adjacent portions of said neck, said ball bearing retaining plate and said top plate forming an annular raceway, and
    ball bearings encapsulated in said annular ball bearing raceway,
    said ball bearing plate includes a rim extending inwardly for sliding engagement with said neck with its annular groove in its inner and uppermost end adjacent said groove in said neck, and an outer annular sleeve extending upwardly from said rim and spaced from and about said neck to form an annular chamber therebetween, and wherein the length of said neck from below its groove to said shoulder is greater than the height of said ball bearing rim for positioning said ball bearing retaining rim on said platform so that its groove is below said neck groove to facilitate loading of the ball bearings prior to said top plate being releasably secured thereto, and
    said top plate includes an inner annular sleeve depending therefrom with its annular groove in the lower and inner end thereof and wherein said inner annular sleeve slidably extends into said annular chamber when said plates are releasably secured together for encapsulating said ball bearings in said annular raceway.

2. The caster of claim 1, wherein said top plate is releasable from said ball bearing plate to allow access to said plates, bearings and other components of said caster for inspection, cleaning, repair, modification and replacement.

3. The caster of claim 1, wherein said caster is of the swivel type in which said wheel rotates along its axis as well as about its axis relative to said plates.

4. The caster of claim 1, wherein said neck includes an annular groove in the top thereof and said top plate includes an annular groove in the bottom thereof which forms a load raceway, and wherein load ball bearings are enclosed in said load raceway.

5. The caster of claim 1, wherein said said ball bearing retaining plate and said top plate, neck, platform and legs are formed from a resin mixture of fiberglass fibers bound together by a polyester resin.

6. The caster of claim 1, wherein said top plate includes openings about its periphery for screws which are adapted to secure the caster to an object.

7. The caster of claim 1, wherein said neck and top include central aligned openings therein for a through bolt which is adapted to secure the caster to an object.

8. The caster of claim 1, wherein the contiguous surfaces of said said ball bearing retaining plate and said top plate include mating means for quickly and properly aligning said plates.

9. The caster of claim 1, wherein:
said neck includes a central opening, and
said top plate includes a central annular sleeve depending therefrom which is within said inner annular sleeve and which extends into said central opening in said neck.

10. The caster of claim 9, wherein said central depending annular sleeve of said top plate and the central portion of said top plate includes a central opening, and
a through bolt which extends through said central openings in said neck and top plate for securing the caster to the object to be carried.

11. The caster of claim 1 comprising;
means for releasably securing said top plate to said neck to prevent relative movement therebetween.

12. The caster of claim 1, wherein said means includes holes in the top of said neck and threaded holes in said top plate adapted to be in alignment, and screws adapted to extend through the holes in said top plate and be threaded into the holes of said neck to prevent relative movement therebetween.

13. The caster of claim 1 comprising:
said wheel having a hub which is offset rearwardly toward said leg and which defines a cavity about said hub,
an axle passing through said hub for rotatable engagement with the lower end portion of said leg,
means for securing said wheel to said axle so that said axle rotates with said wheel, and
a guard secured to said leg which covers said cavity to inhibit the entry of foreign matter into said cavity and about said hub.

14. The caster of claim 13, wherein said wheel includes a cavity in the front portion thereof open to said hub, and a cap releasably secured to said wheel which covers said front cavity to inhibit the entry of foreign matter thereinto and about said hub.

15. The caster of claim 13, wherein the lower portion of the leg is inclined rearwardly at an acute angle relative the remaining portion of the leg, and wherein said wheel is rotatably connected and is parallel to said inclined portion of said leg.

16. In a caster having leg means for a wheel rotatably connected thereto and ball bearings for handling stress and strain imposed upon the caster, a three piece assembly for encapsulating the ball bearings comprising:
a neck at the top portion of the caster,
a ball bearing retaining member normally about said neck,
a top plate about said neck and above and releasably secured to said ball bearing retaining member,
complementary annual grooves in adjacent portions of said neck, member and plate which form an annular raceway,
ball bearings in said raceway,
said neck, member and plate comprise an anti-corrosive, washable, rigid and hard plastic containing material which will stand the external forces applied to the caster and the internal forces imposed by the bearings in said raceway,
said ball bearing member includes a rim extending inwardly for sliding engagement with said neck with its annular groove in its inner and uppermost end adjacent said groove in said neck, and an outer annular sleeve extending upwardly from said rim and spaced from and about said neck to form an annular chamber therebetween to facilitate loading and encapsulating the ball bearings,
said top plate includes an inner sleeve depending therefrom with its annular groove in the lower and inner end thereof and wherein said inner annular sleeve slidably extends into said annular chamber when said member and plate are releasably secured together for encapsulating the ball bearings in said annular raceway, and
means for releasably securing said member and plate together.

17. The caster of claim 16, wherein said top plate is releasable from said ball bearing plate to allow access to said plate, member, bearings and other components of said caster for inspection, cleaning, repair, modification and replacement.

18. The caster of claim 16, wherein the caster is of the swivel type in which the wheel rotates along its axis as well as about its axis relative to said member and plate.

19. The caster of claim 16, wherein said neck includes an annular groove in the top thereof and said top plate includes an annular groove in the bottom thereof which forms another raceway, and wherein ball bearings are enclosed in said another raceway.

20. The caster of claim 16, wherein said plate, member, neck and leg means are formed from a resin mixture of fiberglass fibers bound together by a polyester resin.

21. The caster of claim 20, wherein said fiberglass comprises about 45% by weight of said mixture.

22. The caster of claim 16, wherein said top plate includes openings about its periphery for screws which are adapted to secure the caster to an object.

23. The caster of claim 16, wherein said neck and top plate include central aligned openings therein for a through bolt which is adapted to secure the caster to an object.

24. The caster of claim 16, wherein the contiguous surfaces of said plate and member include mating means for quickly and properly aligning and plate and member.

25. The caster of claim 16, wherein the length of said neck below said raceway is greater than the height of said rim of said ball bearing retaining member so that said rim can be positioned below said raceway to facilitate loading of the ball bearings prior to said top plate being releasably secured thereto.

26. The caster of claim 25, wherein:
said neck includes a central opening, and
said top plate includes a central annular sleeve depending therefrom which is spaced from and within said inner annular sleeve and which extends into said central opening in said neck.

27. The caster of claim 26, wherein said central depending annular sleeve of said top plate and the central portion of said top plate includes a central opening for a through bolt which is adapted to extend through said central openings in said neck and top plate for securing the caster to the object to be carried.

28. The caster of claim 16, wherein the caster comprises means for releasably securing said top plate to said neck to prevent relative movement therebetween.

29. The caster of claim 28, wherein said means includes holes in the top of said neck and threaded holes in said top plate adapted to be in alignment, and screws adapted to extend through the holes in said top plate and be threaded into the holes of said neck to prevent relative movement therebetween.

30. The caster of claim 16 comprising:

a wheel having a hub which is offset rearwardly toward said leg and which defines a cavity about said hub, an axle passing through said hub for rotatable engagement with the lower end portion of said leg, means for securing said wheel to said axle so that said axle rotates with said wheel, and a guard secured to said leg which covers said cavity to inhibit the entry of foreign matter into said cavity and about said hub.

31. The caster of claim 30, wherein said wheel includes a cavity in the front portion thereof open to said hub, and a cap releasably secured to said wheel which covers said front cavity to inhibit the entry of foreign matter thereinto and about said hub.

32. The caster of claim 30, wherein the lower portion of the leg is inclined rearwardly at an acute angle relative the remaining portion of the leg, and wherein said wheel is rotatably connected and is parallel to said inclined portion of said leg.

* * * * *